A. V. F. MARION.
MAGNETIC COMPASS.
APPLICATION FILED JAN. 30, 1919.
1,304,789.
Patented May 27, 1919.
2 SHEETS—SHEET 1.
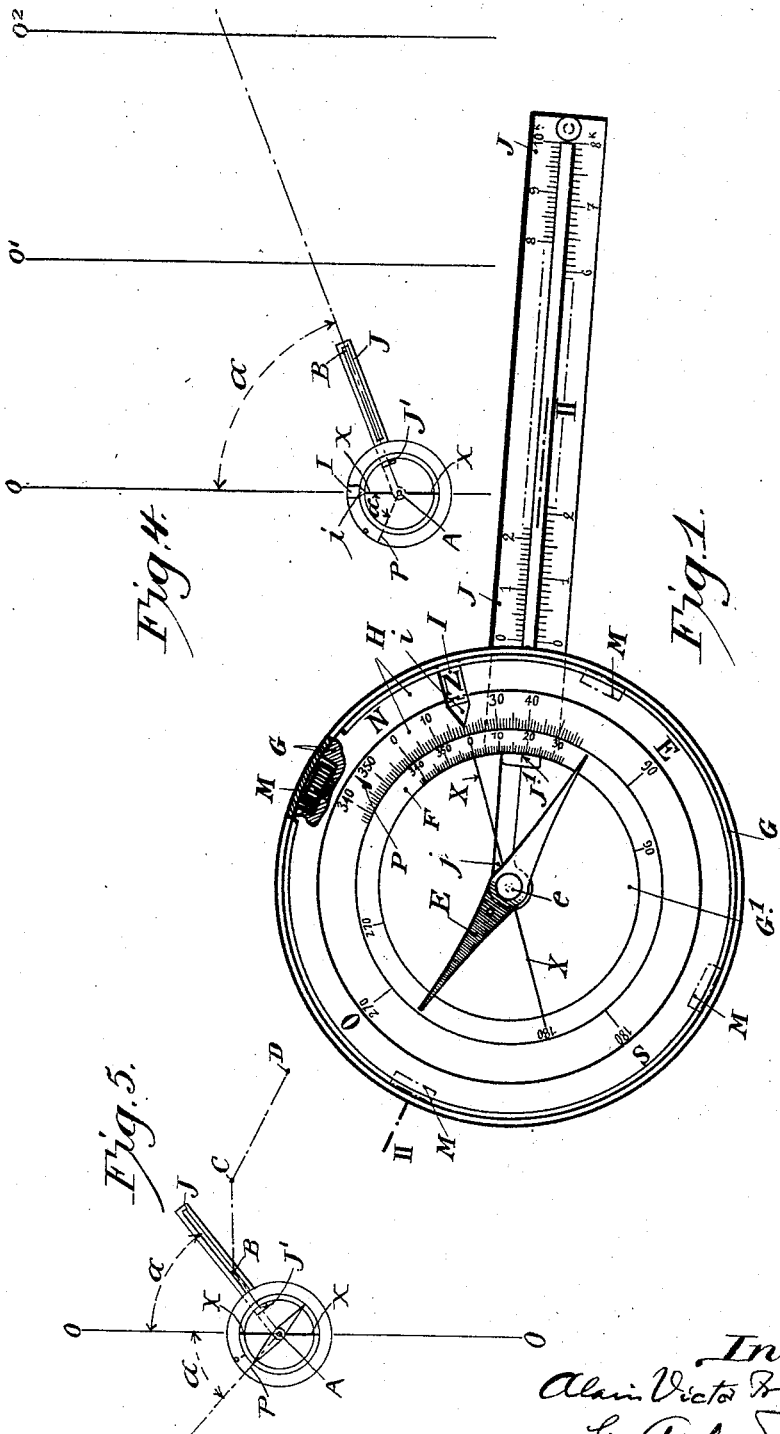
Inventor:
Alain Victor Francis Marion
by Arthur ——,
Atty.

A. V. F. MARION.
MAGNETIC COMPASS.
APPLICATION FILED JAN. 30, 1919.
1,304,789.
Patented May 27, 1919.
2 SHEETS—SHEET 2.
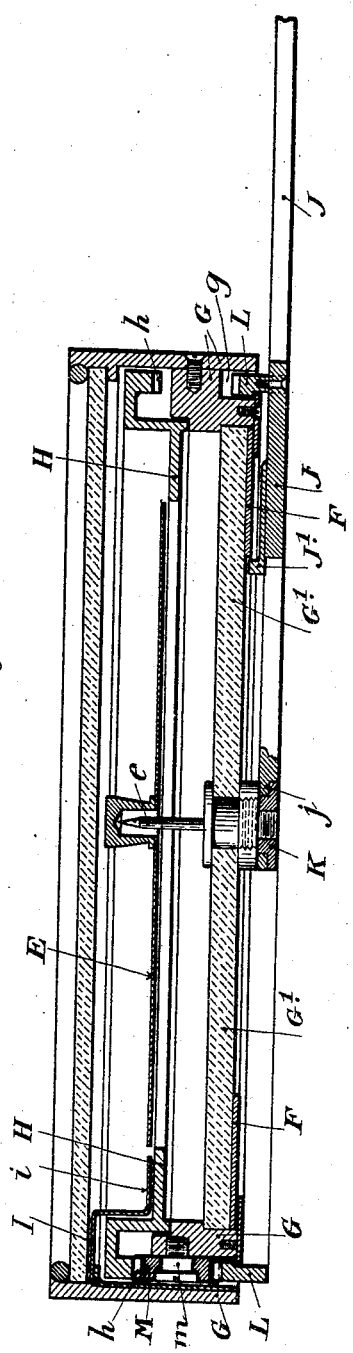
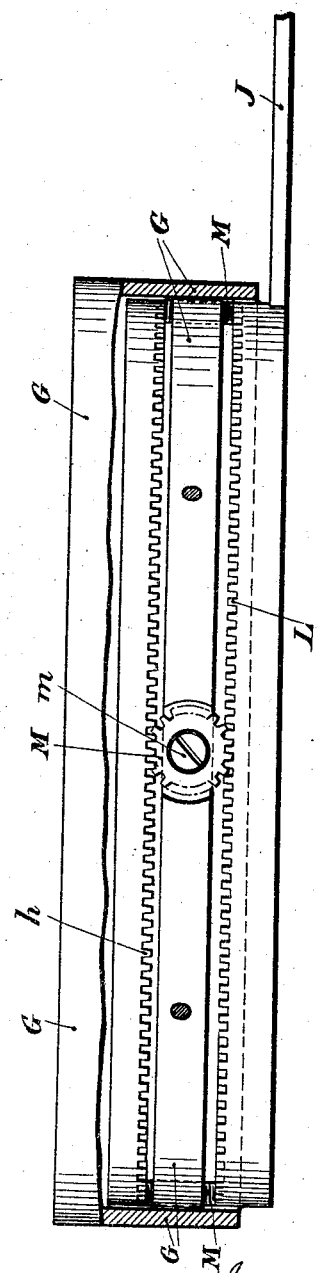

UNITED STATES PATENT OFFICE.

ALAIN VICTOR FRANCIS MARION, OF PARIS, FRANCE.

MAGNETIC COMPASS.

1,304,789.  Specification of Letters Patent.  Patented May 27, 1919.

Application filed January 30, 1919. Serial No. 274,084.

*To all whom it may concern:*

Be it known that I, ALAIN VICTOR FRANCIS MARION, citizen of the French Republic, and resident of 6 Rue Daunou, Paris, France, have invented a new and useful Improvement in Magnetic Compasses, which invention is fully set forth in the following specification.

The invention relates to a magnetic compass and consists in improvements comprising a fixed graduated dial, a concentric movable dial also graduated, a graduated alidade pivoted to the center of the compass box and connected by gearing to the movable dial, so that any angular movement imparted to the alidade causes an equal rotation of the movable dial in the opposite direction.

The bottom of the box is closed by a glass plate on which a reference line joining the 0 and 180 graduations of the fixed dial is traced.

The angular position of the movable dial is read on an index projecting into the interior of the box, which is set opposite the zero of the fixed dial and indicates the angular rotation imparted to the alidade which is also indicated by an index line carried by the alidade and moving opposite to the graduations on the fixed scale.

In the accompanying drawings, Figure 1 is a plan of an embodiment of a compass according to the invention;

Fig. 2 is a section on a larger scale on the line II—II of Fig. 1;

Fig. 3 is a side elevation, the box being supposed to be partially cut open;

Figs. 4 and 5 are diagrams showing the method of using the compass for two different operations.

The compass is provided in the usual manner with a magnetic needle E rotatable on a pivot $e$ at the center of a box G in which is fixed a graduated dial F.

According to the invention a movable graduated dial H concentric with the fixed dial F is arranged in a plane above the latter, the graduations being marked on a circle which surrounds that of the graduations of the fixed dial F. The bottom of the box is closed by a glass plate $G^1$ and carries traced thereon a lubber's line X—X passing from zero to 180 of the fixed dial F. An index I projects in the box G so that the divisions of the movable dial H can be read directly below the index. This index is placed so as to coincide with the zero of the fixed dial F.

The dial H is connected by gearing to a graduated alidade J one end $j$ of which is mounted on a pivot K forming an extension of the needle pivot $e$ secured to the glass plate $G^1$. The graduated alidade J is integral with a circular rim L toothed on its upper face and movable in a housing $g$ provided in the box G. The teeth of the rim L mesh with pinions M of which the axes $m$ are carried by the box G. These pinions mesh with teeth $h$ provided below the periphery of the dial H.

It will be understood that if the box G is held in the hand, upon manipulating the alidade J the dial H will be turned through the same angle in the opposite direction. On the longitudinal axis of the alidade J is an index line $J^1$ which rotates in contact with the graduations of the fixed dial F. The alidade is formed as a graduated rule and is provided with two or more sets of graduations showing distances on different scales. In the example shown the rule carries two sets of graduations respectively to the scale of 1 in 80,000 and 1 in 100,000. On the axis of the alidade is a recess in which the point of a pencil can be engaged and a line can be traced when the alidade is applied to a sheet of paper.

If, for example, the alidade is turned so as to be placed on the division 45° of the fixed circle F, the zero of the moving circle H is automatically displaced in the opposite direction through 45° and the division 45 of this circle comes then below the index I which coincides with one end of the lubber's line X—X etched on the glass plate $G^1$ of the compass. The angle between the alidade J and the line X—X is therefore always equal to that between the lubber's line and the zero of the movable dial H.

The compass described allows rapid surveys to be taken by day or night without using a sighting device—plane surveys, since they are made always where the height of the ground is known, in the form of directing plans or topographical charts.

It is designed for the use of infantry officers and would enable them after a battle to rapidly survey the positions occupied and send a very exact sketch to the command, before the issue of the directing plans comprising the skeleton surveys connecting the batteries. The commanding officers, intelligence officers, pioneer officers and naturally all the staff officers would find constant and daily use for the instrument.

The protractor compass would rapidly solve more particularly the following problems:

(1.) To determine the direction of march.—If we wish to march from a point A on the map (see Fig. 4) toward a point B it is sufficient to place the center of the compass over A, the lubber's line parallel to the meridian O of the map and to turn the alidade J until it passes through B. We can then read the angle α by that graduation of the fixed dial which is opposite the index J¹.

(2.) To march in a given direction.—In the preceding operation the angle of march has been indicated automatically. By virtue of the fundamental principle of the new compass the zero of the movable dial H is displaced (assuming for example 45° east) by 45° toward the left. If therefore, holding the compass so that the reference line is directly in front at the starting point, the holder turns around until the magnetic needle is opposite the declination line P marked on the movable dial, he is then facing the direction to be followed. He can now march, taking care to maintain always the lubber's line X—X before him and the north point of the needle opposite the declination line; or a bearing can be taken to guide the march.

(3.) To determine the angular direction of a march.—When marching in an unknown direction, the lubber's line of the compass being held straight in front, the alidade is turned until the declination mark is under the north point of the compass; the direction of march is then automatically indicated; the angle is shown by the index J¹.

If we knew the position of the station it would be sufficient to take the map and without disturbing the compass place it with its lubber's line parallel to the geographical meridian, the center over the point represented by the station. If a line is traced with a pencil against the alidade the direction of march will be placed on the map and we can see then toward what point we are marching.

(4.) To take the bearings of a line of trenches.—Let A—B—C—D (Fig. 5) be a line of trenches that we occupy. A squared paper is placed on the plane table. Assuming the observer to be at the position A, the compass is placed on the plane table and the lubber's line parallel to the north-south line selected as the meridian of the sketch to be made. Facing the direction B the declination mark P is brought under the north point of the needle; the alidade will then show the orientation of the element A—B and it is sufficient to trace a pencil mark. We can now march and count the steps in order to determine the length of the element A—B, which is reduced to scale by means of the graduations on the alidade rule. Having arrived at B where the trench changes its direction, we recommence the operation and so on until the survey is finished.

We see by the preceding that there is no necessity for inclining the plane table nor of making any sighting observations and that we can thus by means of the protractor compass take surveys even in subterranean galleries or at night solely by walking.

(5.) To mark out on the ground a line of trenches shown on the map.—This problem, the inverse of the preceding, which would be most frequently executed at night, is one of the simplest with the protractor compass.

Before starting, the operator takes the bearing with the compass on the map of the direction of the elements A—B, B—C, C—D and their lengths which he sets down in a note book. Then, starting from A, it will be sufficient by the aid of the compass to march in a given direction for a certain number of meters as in the case of problem No. 2; the markers follow him, setting a stake every 5 meters, for example; when he has arrived at the end of the element A—B he will set his compass to the angle of the element B—C and will continue in the same manner.

The same principles can be applied in the construction of roads, railways, etc.

The small capital letter K appearing near reference character J on Fig. 1 denotes kilometer.

What I claim is:—

1. In a magnetic compass the combination with the compass-box, of a pivoted magnetic needle, a fixed graduated dial, a concentric graduated movable dial, a graduated alidade pivoted at the center of the said compass box and a gearing connecting it to the said movable dial, so that any angular movement imparted to the alidade causes an equal rotation of the said movable dial in the opposite direction.

2. A compass according to the preceding claim in which connected to the alidade is provided a toothed circular rim, pinions mounted in the compass box in engagement with said rim and teeth on the movable dial in mesh with said pinion.

3. A compass according to claim 1 or 2, in which the bottom of the box is formed of transparent material on which is traced a lubber's line extending from zero to 180° of the graduations of the fixed dial, an index carried by the box and indicating the angular movements of the movable dial, and an index line carried by the alidade and indicating the angular movements of the latter by the graduations on the fixed dial.

4. A compass according to claim 1 in which the alidade is provided with two scales of distances.

5. A compass according to claim 1 in which the alidade is provided with an axial recess in which a pencil or other tracing device can be inserted.

In testimony whereof I have signed this specification.

ALAIN VICTOR FRANCIS MARION.

Copies of this patent may be obtained for five cents each, by addressing the "Commissioner of Patents, Washington, D. C."